N. D. OLSON.
ADJUSTABLE FRAME FOR SAW BLADES.
APPLICATION FILED FEB. 17, 1921.
1,399,316. Patented Dec. 6, 1921.
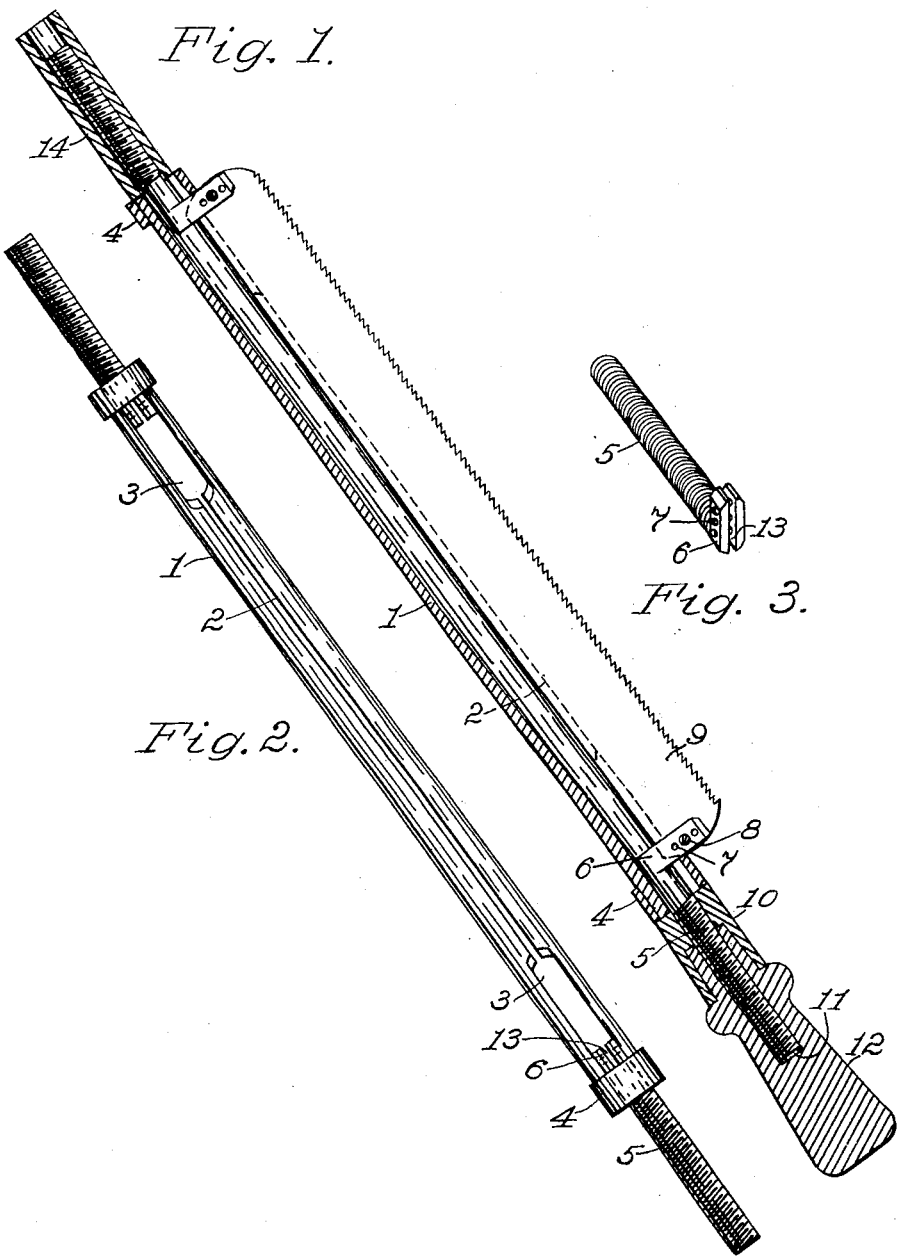
Inventor,
Neils D. Olson, by
G. C. Kennedy,
Attorney.

UNITED STATES PATENT OFFICE.

NEILS D. OLSON, OF WATERLOO, IOWA.

ADJUSTABLE FRAME FOR SAW-BLADES.

1,399,316.  Specification of Letters Patent.  Patented Dec. 6, 1921.

Application filed February 17, 1921. Serial No. 445,762.

*To all whom it may concern:*

Be it known that I, NEILS D. OLSON, a citizen of the United States of America, and a resident of Waterloo, Blackhawk county, Iowa, have invented certain new and useful Improvements in Adjustable Frames for Saw-Blades, of which the following is a specification.

My invention relates to improvements in adjustable frames for saw blades, and the object of my improvement is to supply for back-saws and the like holding means adjustable to receive and removably retain different lengths and widths of blades, also permitting adjustments of the blades at an angle to the holder.

This object has been accomplished by the means which are hereinafter described and claimed, and which are illustrated in the accompanying drawings, in which Figure 1 is a central longitudinal section of my improved adjustable saw-frame or holder, with parts including a saw blade shown in elevation; Fig. 2 is an elevation of said holder with parts removed including said saw blade, taken at an angle of ninety degrees from said Fig. 1, and Fig. 3 is a perspective view of one of the adjustable blade-clamps as separated from the frame or holder.

Similar numerals of reference denote similar parts throughout the several views.

1 is a tubular holder or back for a saw blade 9, and has along one side a longitudinal slot 2 to receive the back part of the blade, the end parts 3 of the slot being widened for a purpose to be disclosed. On the opposite ends of the holder tube 1 like sleeves 4 are secured as by spot-welding, permanently. Before these sleeves are thus secured on the tube 1, like threaded stems or screws 5 are positioned with their inner ends within the bore of the tube, their threaded parts being exposed outwardly thereof, and their inner ends, which are integrally fashioned with angularly directed forks 6 having an interspace 13 arranged with the forks emerging outwardly from and through the wider slot parts 3. The threaded stem 5 is made of such a diameter as to be freely slidable to and fro longitudinally within the bore or hollow of the tube 1 so that the forks 6 may be positioned at any longitudinally-adjusted position with the slot parts 3.

The forks 6 are provided with a number of alined holes 7 to receive in either a fastening pin or screw 8, the latter passed through a registering opening usually provided in that end part of a saw blade 9 which is mounted in the slot 13 between the forks. By this means a blade 9 may be bodily adjustably mounted in the slot 2 of the tubular back 1 for adjustments to and from said back angularly as desired, to uncover a certain width of the blade relative to said back or to properly mount in the frame blades of different widths. Furthermore, it is evident that when the forks 6 have been adjusted in the extent of their longitudinal separation in the slot parts 3, saw or other blades of different lengths may be mounted in said frame within the scope of said slots.

To adjust and secure the said forks in a desired relation of longitudinal adjustment, sleeve-nuts are placed on the threaded shanks of the stems 5, such as are shown at 10 and 14 at opposite ends of the tubular holder 1 to bear against the abutting ends of the holder 1, so that when either or both of said sleeve-nuts are turned in one or the other direction, the forks 6 are moved longitudinally to or fro in said slots 3 to the desired amount of separation.

One sleeve-nut 10 is modified by having a larger counterbore at its outer end to provide a socket for a tubular boss on a handle 12, the handle having a longitudinal socket 11 receiving the outer end of the stem 5.

This saw-frame provides a tubular back 1 which strongly supports and stiffens the blade 9, yet has little projection therefrom, so that the tool may be conveniently used in restricted locations where a wider frame could not be employed.

It is to be understood that various changes may be made in the embodiment of this invention, without departing from its principles or the scope of its protection.

Having described my invention, what I claim as new, and desire to secure by Letters Patent, is:

In combination, an elongated blade, a tubular holder therefor having a longitudinal slot to receive the back of said blade, and like adjustable securing-devices positioned at opposite ends of said holder, each comprising a threaded stem slidably mounted in the hollow thereof to project therefrom, said stem having its inner end bent and projected outwardly through said slot and bifurcated to receive said blade and having a plurality of engaging-means to fasten the blade releasably in adjusted positions angularly away from said holder, and sleeve-nuts on said threaded stems engaging ends of said holder for securing said stems and their bifurcations in desired positions of longitudinal adjustment.

Signed at Waterloo, Iowa, this 19th day of Jan. 1921.

NEILS D. OLSON.